United States Patent
Yu

(10) Patent No.: US 9,552,040 B2
(45) Date of Patent: Jan. 24, 2017

(54) LOW POWER IDLE SIGNALING FOR GIGABIT MEDIA INDEPENDENT INTERFACES OPERATING IN LEGACY MODES

(75) Inventor: Hongchun Yu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 14/378,273

(22) PCT Filed: Mar. 5, 2012

(86) PCT No.: PCT/CN2012/071930
§ 371 (c)(1),
(2), (4) Date: Aug. 12, 2014

(87) PCT Pub. No.: WO2013/131231
PCT Pub. Date: Sep. 12, 2013

(65) Prior Publication Data
US 2015/0019887 A1    Jan. 15, 2015

(51) Int. Cl.
*G06F 1/32* (2006.01)
*H04L 12/931* (2013.01)
*H04L 12/12* (2006.01)

(52) U.S. Cl.
CPC ............ *G06F 1/3209* (2013.01); *H04L 12/12* (2013.01); *H04L 49/351* (2013.01); *Y02B 60/32* (2013.01); *Y02B 60/34* (2013.01); *Y02B 60/35* (2013.01)

(58) Field of Classification Search
None
See application file for complete search history.

(56) References Cited

U.S. PATENT DOCUMENTS

| 7,920,597 B2 | 4/2011 | Conway et al. |
| 8,107,365 B2 | 1/2012 | Barrass |
| 8,259,716 B2 | 9/2012 | Diab |
| 8,300,655 B2 | 10/2012 | Tazebay et al. |

(Continued)

FOREIGN PATENT DOCUMENTS

| EP | 2184890 A1 | 5/2010 |
| WO | WO-2012001753 A1 | 1/2012 |

OTHER PUBLICATIONS

"IEEE P802.3az D2.1 Energy efficient Ethernet comments", IEEE DRAFT; Comments received, IEEE-SA, Piscataway, NJ USA, Nov. 7, 2009, XP017635911, vol. 802.3, pp. 1-62. [retrieved on Nov. 7, 2009].

(Continued)

*Primary Examiner* — Paul Yanchus, III
(74) *Attorney, Agent, or Firm* — Paradice and Li LLP

(57) ABSTRACT

A method and apparatus for enabling low power idle (LPI) signaling for Ethernet transceivers operating in legacy modes are disclosed that allow a high speed transceiver to retain energy efficient Ethernet (EEE) functionality even when the transceiver is operating in a slower speed mode. In some embodiments, an Ethernet device may enter an LPI mode upon receiving a regular LPI signal when its media independent interface (MII) is operating at a first transmission rate, and may enter the LPI mode upon receiving a modified LPI signal when the MII is operating at a first speed operating at a second transmission rate that is slower than the first transmission rate.

20 Claims, 4 Drawing Sheets

(56) References Cited

U.S. PATENT DOCUMENTS

| | | |
|---|---|---|
| 2009/0204827 A1 | 8/2009 | Diab et al. |
| 2009/0204828 A1 | 8/2009 | Diab et al. |
| 2010/0111081 A1* | 5/2010 | Diab .................. H04L 12/12 370/389 |
| 2012/0257520 A1* | 10/2012 | Li ...................... H04L 12/12 370/252 |
| 2012/0320771 A1 | 12/2012 | Chini et al. |

OTHER PUBLICATIONS

Supplementary European Search Report—EP12870571—Search Authority—Munich—2015—Oct. 12, 2015.
International Search Report and Written Opinion—PCT/CN2012/07193—ISA/EPO—Dec. 13, 2012.

* cited by examiner

LOW POWER IDLE SIGNALING FOR GIGABIT MEDIA INDEPENDENT INTERFACES OPERATING IN LEGACY MODES

TECHNICAL FIELD

The present embodiments relate generally to electronic communications, and specifically to Ethernet communication systems.

BACKGROUND OF RELATED ART

Among the technologies that allow computers and/or other network devices to form a local area network (LAN), Ethernet has become the dominant networking technology and is standardized in the IEEE 802.3 family of standards. The Ethernet standard has evolved over time so that different variants of the Ethernet protocol now exist to support higher bandwidth, improved media access controls, different physical media channels, and/or other functionalities. For example, IEEE 802.3 now has variants covering speeds (or transmission rates) ranging from 10 Mbit/s, 100 Mbit/s, 1 Gbit/s, to 10 Gbit/s and even higher, and has variants that govern physical channels such as coaxial cables, fiber-optics, and unshielded/shielded twisted-pair cables.

One concern associated with Ethernet devices is power consumption. Because of the simultaneous bidirectional (e.g., full duplex) nature of Ethernet communications, transceivers employed in Ethernet devices and/or networks may consume significant power when operating at very high speeds (e.g., 1 Gbit/s or 10 Gbit/s). Thus, if there is little or no data being transmitted over an associated data link, the transceivers may be instructed to enter a low power mode to reduce power consumption. For example, the Energy Efficient Ethernet (EEE), which is described in the IEEE 802.3az standard, employs a low power idle (LPI) signal that may place the transmitter portions of such transceivers into a "sleep" mode when there is no data to be transmitted. Although assertion of the LPI signal may disable the transmitter portions during the sleep mode, the receiver portions of the transceivers typically remain operational, thereby allowing the transceiver to receive data even though the transmitter portions are in sleep mode. The sleep mode may be terminated by de-asserting the LPI signal (or providing a "normal idle" signal) to "wake-up" the transmitter portions of the transceivers, thereby allowing the transceivers to resume data transmissions.

Typically, a newer Ethernet variant is required to operate at slower speeds to provide backwards compatibility with legacy devices and/or with older Ethernet standards. It is common for the transceivers to repeat the data being sent when operating at slower speeds. For example, a transceiver capable of 1 Gbit/s speeds may simply repeat the transmission of data 10 times when operating in a 100 Mbit/s mode, and repeat the transmission of data 100 times when operating in a 10 Mbit/s mode. However, because many variants of the Ethernet standards were developed before the EEE (e.g., IEEE 802.3az) standards were implemented, the LPI signal designed to trigger sleep mode for high-speed transceivers (e.g., capable of 1 Gbit/s) may not work properly when such transceivers are operating at slower speeds (e.g., at 100 Mbit/s). Similarly, the LPI signal may not work properly when such transceivers perform data repetition and/or combination techniques for any other applicable reasons including, for example, combining several channels to create a higher bandwidth, and/or transmitting data using a dedicated 8 bit/10 bit serializer/deserializer (8 B/10 B SerDes).

Accordingly, there is a need to enable LPI signaling for high-speed Ethernet transceivers that operate in legacy modes (e.g., at slower speeds).

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

A method and apparatus for enabling low power idle (LPI) signaling for Ethernet transceivers operating in legacy modes are disclosed that allow a high speed transceiver to retain energy efficient Ethernet (EEE) functionality even when the transceiver is operating in a slower speed mode. In some embodiments, an Ethernet device may enter an LPI mode upon receiving a regular LPI signal when its media independent interface (MII) is operating at a first transmission rate, and may enter the LPI mode upon receiving a modified LPI signal when the MII is operating at a second and slower transmission rate.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
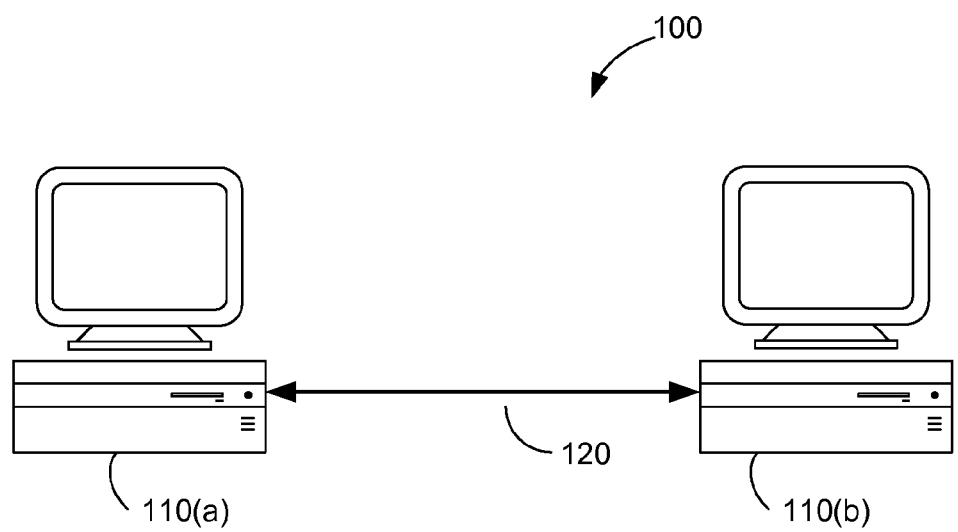
FIG. 1 is a block diagram of a communication system within which the present embodiments may be implemented.

FIG. 1 is a block diagram of an exemplary communication system 100 within which the present embodiments may be implemented. Communication system 100 is shown to include two network devices 110(*a*) and 110(*b*), which are coupled to each other by an established data link 120. Network devices 110(*a*) and 110(*b*) may exchange data through data link 120. Network devices 110(*a*) and 110(*b*) may be any suitable network-enabled devices including, for example, computers, switches, routers, hubs, gateways, access points, or the like. Also, according to the present embodiments, network devices 110(*a*) and 110(*b*) may include any electronic device capable of connecting to either a wired or a wireless network including, for example, a mobile phone, a personal digital assistant (PDA), a set-top box, or a game console. Of course, network devices 110(*a*) and 110(*b*) and data link 120 are just exemplary components of a network, as the network may further include any number of suitable devices to form a larger network including, for example, a local area network (LAN), a wide area network (WAN), a wireless LAN (WLAN), and/or may be connected to the Internet. Data link 120 may be any suitable physical media channel including, for example, coaxial cables, fiber-optics, and/or unshielded/shielded twisted pairs.

Network devices 110(*a*)-110(*b*) may communicate with each other using Ethernet technologies, as described in the IEEE 802.3 family of standards. More specifically, for exemplary embodiments described herein, network devices 110(*a*)-110(*b*) are each equipped with Ethernet-compliant transceivers (not shown in FIG. 1 for simplicity) that are capable of transmitting and receiving data packets at speeds of at least 1 Gbit/s, and are backwards compatible to operate at slower speeds, for example, 100 Mbit/s or 10 Mbit/s. For purposes of discussion herein, the terms "slower speed" and "legacy mode" refer to a transmission rate that is less than 1 Gbit/s, which includes 100 Mbit/s or 10 Mbit/s, whereas the terms "high speed" and "higher speed" refer to a transmission rate that is equal to or greater than 1 Gbit/s. Furthermore, network devices 110(*a*)-110(*b*) are capable of reducing the power consumption of their transceivers when not transmitting any data, and are therefore compliant with the IEEE 802.3az standards (EEE).

According to the present embodiments, an Ethernet device having a Gigabit Media Independent Interface (GMII) coupled between its Media Access Control (MAC) layer and its physical (PHY) layer may enter a low power idle (LPI) mode (as defined by IEEE 802.3az) upon receiving a regular LPI signal when the GMII is operating at a first transmission rate, and enter the LPI mode upon receiving a modified LPI signal when the GMII is operating at a second transmission rate that is higher than the first transmission rate. As explained in more detail below, the modified LPI signal allows the Ethernet device to enter the LPI mode when operating at slower speeds by preventing the LPI signal from being distorted by decoding operations typically associated with reducing the transmission rate from a high speed of approximately 1 Gbit/s to slower speeds of approximately 100 Mbit/s or lower. In some embodiments, the Ethernet device may determine a transmission rate at which the GMII is operating, and in response thereto selectively generate either the regular LPI signal or the modified LPI signal to be provided from the MAC layer to the PHY layer. In addition, the Ethernet device may determine whether the LPI signal is a regular LPI signal or a modified LPI signal in response to the determined transmission rate. In this manner, the present embodiments may enable LPI signaling for Ethernet transceivers operating in legacy modes.

Figure 2:
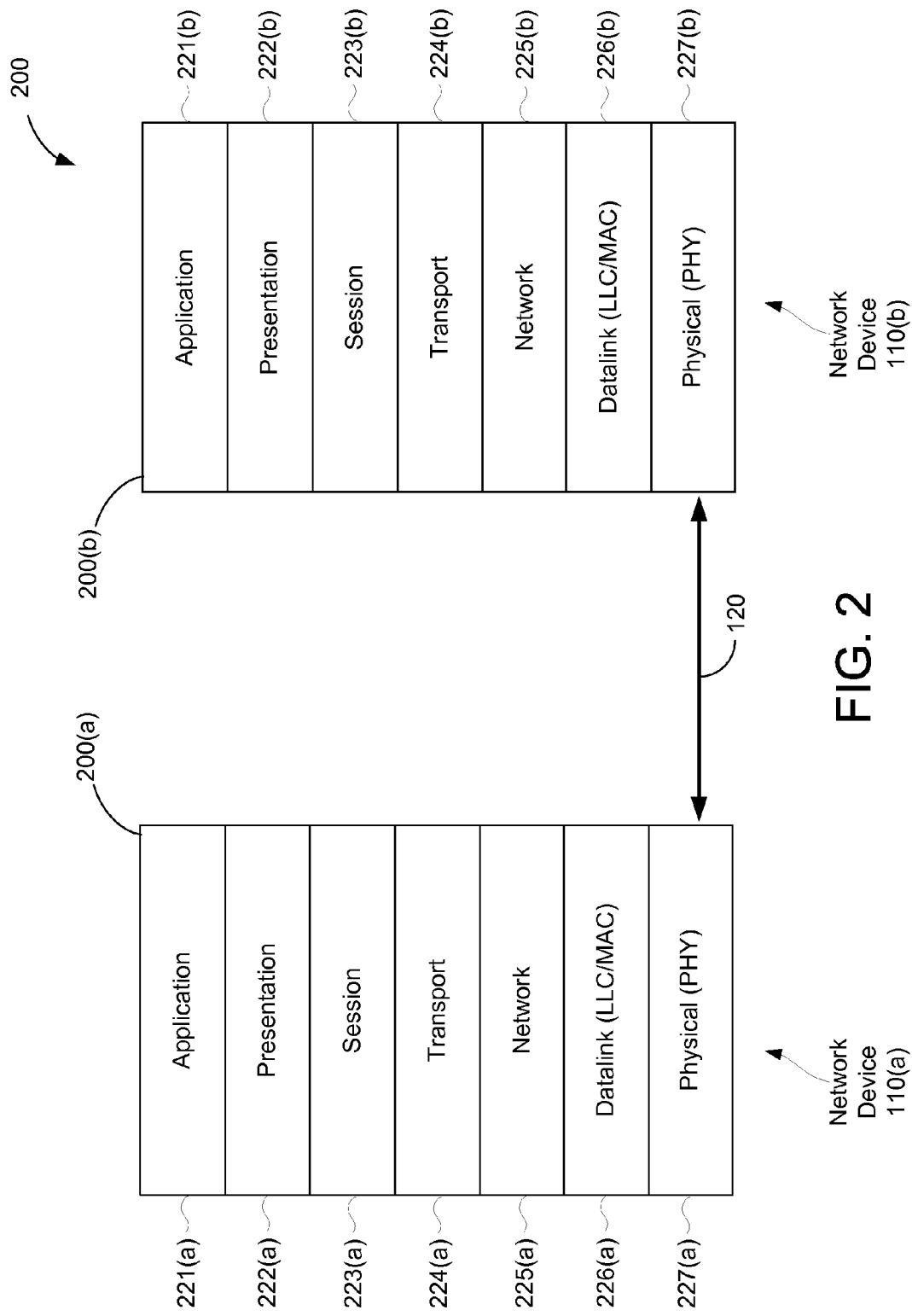
FIG. 2 is a block diagram of the open system interconnection (OSI) model representative of the network devices of FIG. 1.

FIG. 2 is a block diagram of the open system interconnection (OSI) models 200(*a*)-200(*b*) representative of the network devices 110(*a*) and 110(*b*), respectively, of FIG. 1. As in FIG. 1, network devices 110(*a*)-110(*b*) are coupled to each other by the established data link (or physical channel) 120. As depicted in FIG. 2, the OSI model 200 is divided into seven logical layers: (1) an application layer 221; (2) a presentation layer 222; (3) a session layer 223; (4) a transport layer 224; (5) a network layer 225; (6) a datalink layer 226; and (7) a physical layer 227. Although the OSI model 200 may be used to represent network devices 110(*a*) and 110(*b*) for purposes of discussion herein, it is noted that other suitable models may be used to represent Ethernet devices configured in accordance with the present embodiments.

The higher in hierarchy an OSI layer is, the closer it is to an end user; the lower in hierarchy an OSI layer is, the closer it is to a physical channel. For example, on the top of the OSI model hierarchy is application layer 221, which interacts directly with the end user's software application (not shown in FIG. 2 for simplicity). On the contrary, on the bottom of the OSI model hierarchy is physical layer 227, which defines the relationship between a network device and a physical communication medium, such as twisted-pairs for Ethernet data transmissions.

More specifically, physical (PHY) layer 227 provides electrical and physical specifications, including details like pin layouts and signal voltages, for interactions between network device 110 and physical channel 120. Datalink layer 226 provides the functional and/or procedural details, such as addressing and channel access control mechanisms, for data transmissions between network devices 110(*a*) and 110(*b*). Datalink layer 226 has two sub-layers, which are the logical link control (LLC) layer on the top (in terms of hierarchy), and the media access control (MAC) layer on the bottom. For simplicity, datalink layer 226 is sometimes referred to herein as MAC layer in the following discussion. Although not shown for simplicity in FIG. 2, an interface exists between the MAC layer 226 and the PHY layer 227 to facilitate the exchange of information between the two layers. For purposes of discussion, this interface is referred to herein as the media independent interface (MII). However, it is noted that, depending on the transmission rate and other implementation details, MII may include different currently available or future developed variants including, for example, attachment unit interface (AUI), MII, reduced MII, Gigabit MII (GMII), reduced GMII, serial GMII (SGMII), quad SGMII (QSGMII), and/or 10 GMII.

The MII allows network devices 110(*a*) and 110(*b*) to interface with different types of physical channels 120 (or PHY devices 227) using the same MAC devices 226. MII connects MAC device 226 to different types of PHY devices via an MII bus. When operating at a speed of 1 Gbit/s (e.g., with GMII, SGMII, and/or QSGMII), the MII bus transfers data at 8 bits (or a byte) per clock cycle with a 125 MHz clock. However, per the MII specifications, the MII bus only transfers data at 4 bits (or a nibble) per clock cycle with a 25 MHz clock when operating at a speed of 100 Mbit/s, or 4 bits per clock cycle with a 2.5 MHz clock when operating at a speed of 10 Mbit/s. Thus, to allow for backwards compatibility, an MII capable of operating at a speed of 1 Gbit/s or higher duplicates the nibbles into bytes when operating in legacy modes (e.g., 100 Mbit/s or 10 Mbit/s).

The nibble-to-byte duplicating process works well during normal operations for data transmissions. However, when a higher-speed MII (e.g., GMII, SGMII, and/or QSGMII) combines or duplicates nibbles to form bytes for slower transmission rates (e.g., 100 Mbit/s or 10 Mbit/s), the LPI signals that are intended for a PHY device to enter "sleep"

mode may get distorted and therefore cause the LPI signaling to fail. More specifically, pursuant to IEEE 802.3az standards (EEE), the LPI signals between the MAC layer and the PHY layer (via MII) may be defined as {transmit enable TX_EN="FALSE" (e.g., logic "0"), transmit error TX_ER="TRUE" (e.g., logic "1"), and transmit data TX_DATA=1}. Therefore, in situations where a MAC device operates at slower speeds (e.g., 100 Mbit/s), which means that the MAC device only transmits a nibble (4 bits) per clock cycle, transmit data TX_DATA for LPI signaling is 4'b0001. By the same token, in situations where a MAC device operates at higher speeds (e.g., 1 Gbit/s), which means that the MAC device transmits a byte (8 bits) per clock cycle, transmit data TX_DATA for LPI signaling is 8'b0000_0001. However, when a MAC device operates at slower speeds (e.g., 100 Mbit/s) and when the corresponding LPI signals are transmitted to the PHY device through the higher-speed MII (e.g., GMII, SGMII, and/or QSGMII), because of the nibble-to-byte duplicating, transmit data TX_DATA becomes 8'b0001_0001, which cannot be recognized by the PHY device as an indicator to enter the LPI sleep mode (e.g., because the PHY device typically detects the LPI mode in response to TX_DATA=8'b0000_0001).

According to the present embodiments, network device 110 having a higher-speed MII (e.g., GMII, SGMII, and/or QSGMII) coupled between the MAC layer 226 and the PHY layer 227 may enter a low power idle (LPI) mode (as defined by IEEE 802.3az) upon receiving a regular LPI signal when the GMII is operating at a first transmission rate (e.g., at 1 Gbit/s), and enter the LPI mode upon receiving a modified LPI signal when the GMII is operating at a second and slower transmission rate (e.g., at 100 Mbit/s or at 10 Mbit/s). More specifically, in accordance with some embodiments, the PHY layer 227 of network device 110 (or a corresponding PHY device) may enter the LPI mode upon receiving regular LPI signals (TX_EN=1'b0; TX_EN=1'b1; TX_DATA=8'b0000_0001) when the GMII is operating at higher speeds (e.g., 1 Gbit/s or higher), and may enter the LPI mode upon receiving modified LPI signals (TX_EN=1'b0; TX_EN=1'b1; TX_DATA=8'b0001_0001) when the GMII is operating at slower speeds (e.g., 100 Mbit/s or 10 Mbit/s). With the capability of recognizing both regular LPI signals and modified LPI signals, MAC layer 226 (or a MAC device) may successfully instruct the PHY layer 227 (or a PHY device) to enter and/or exit the LPI sleep mode through the MII, regardless of the speed at which the MII is operating. In this manner, the present embodiments may enable LPI signaling for high-speed Ethernet transceivers that are operating in legacy modes such as 100 Mbit/s or 10 Mbit/s. In addition, for one embodiment, the modified LPI signals may be represented as a combination (e.g., a concatenation) of 10-bit comma sequences K28.5 and D5.2 for correcting disparity, and for another embodiment the modified LPI signals may be represented as a combination (e.g., a concatenation) of 10-bit comma sequences K28.5 and D28.4 for preserving disparity. Of course, the particular combination of 10-bit comma sequences used to represent the modified LPI signals for embodiments described herein are merely exemplary, and may be modified or otherwise altered for actual embodiments. As used herein, GMII may also be SGMII, and/or QSGMII.

It is noted that the modified LPI signals (TX_EN=1'b0; TX_EN=1'b1; TX_DATA=8'b0001_0001) are merely exemplary, and that these assigned symbols may be changed or modified by reconfiguring the associated control and status registers of PHY layer 227 (or the corresponding PHY device) through a management data input/output (MDIO) bus to achieve similar results. Furthermore, it is worth noting that the above-mentioned techniques and embodiments are compatible with current high-speed MII standards because an unmodified, conventional high-speed MII (e.g., GMII, SGMII, and/or QSGMII) will recognize the modified LPI signals as normal idle signals (e.g., that do not adversely affect the internal state machines of the conventional high-speed MII).

Figure 3:
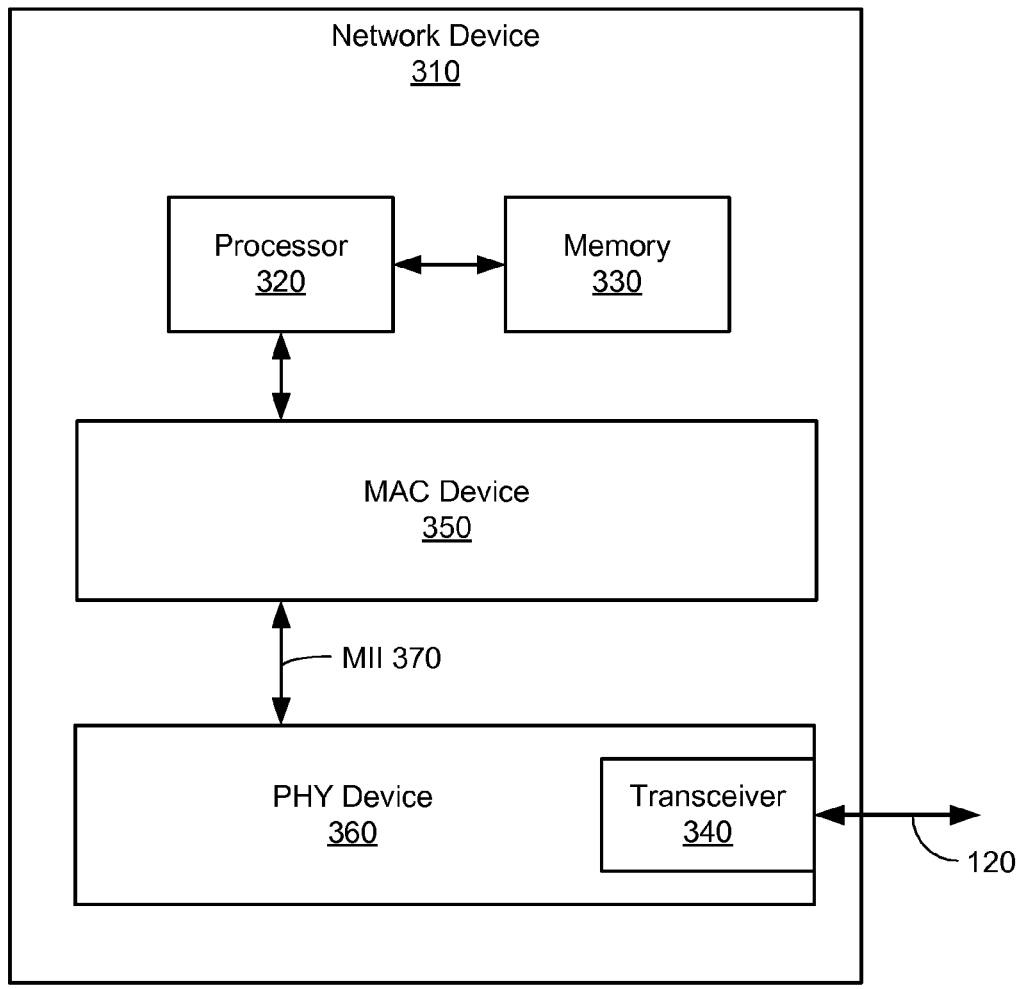
FIG. 3 is a functional block diagram of the network device of FIG. 1 in accordance with some embodiments.

FIG. 3 is a functional block diagram of a network device 310 that is one embodiment of the network devices 110(a) and 110(a) of FIGS. 1 and 2. Network device 310 includes a processor 320, a memory 330, and an Ethernet transceiver circuit 340, which is coupled to physical channel 120 of FIG. 2. Memory 330 may be any suitable memory element or device including, for example, EEPROM or Flash memory. Processor 320 may be any suitable processor capable of executing scripts or instructions of one or more software programs stored, for example, in memory 330. Although not shown in FIG. 3 for simplicity, network device 310 may also include a well-known cache memory that stores frequently used instructions and/or data.

Network device 310 also includes a PHY layer device (or PHY device) 360 and a MAC layer device (or MAC device) 350. MAC device 350 and PHY device 360 are coupled to each other via a media independent interface (MII) 370. Although Ethernet transceiver 340 is illustrated in FIG. 3 as being included in PHY device 360, for other embodiments, transceiver 340 may be a stand-alone device or integrated circuit.

For simplicity, only the MAC layer and the PHY layer in the OSI seven-layer model are shown in FIG. 3, with the two layers being illustrated as two devices. As such, MAC device 350 may be any device or integrated circuit that implements the functions of MAC layer (e.g., layer 226 of FIG. 2), which in turn may be a stand-alone device or may be integrated into network device 310. Similarly, PHY device 360 may be any device or integrated circuit that implements the functions of PHY layer (e.g., layer 227 of FIG. 2), which in turn may be a stand-alone device or may be integrated into network device 310. Of course, as mentioned above, it is noted that MAC layer and PHY layer are logically divided into two components, and that it may not be necessary for the two layers to be physically separated or be implemented onto two separate devices or circuits.

During normal data transmission operations, when an end-user software application on network device 310 transmits data through the network (e.g., to the Internet), processor 320 transmits the data (from top of the OSI layer) through MAC device 350 to PHY device 360. Then, PHY device 360 transmits the data via transceiver 340 onto physical channel 120.

When processor 320 determines that it is desirable for PHY device 360 to enter the LPI mode, for example, when there is no data to be transmitted for an extended period of time, processor 320 sends LPI signals to PHY device 360 through MAC device 350. Assuming MII 370 is a higher-speed MII (e.g., GMII, SGMII, and/or QSGMII), then depending on which speed mode MII 370 is operating in, the LPI signals may be regular LPI signals (TX_DATA=8'b0000_0001) or may be modified LPI signals (TX_DATA=8'b0001_0001). According to the present embodiments, PHY device 360 may enter the LPI sleep mode upon receiving either the regular LPI signals or the modified LPI signals. More specifically, PHY device 360 may enter LPI sleep mode upon receiving the regular LPI signals when MII 370 is operating at higher speeds (e.g., 1

Gbit/s), and may enter LPI sleep mode upon receiving the modified LPI signals when MII 370 is operating at slower speeds (e.g., 100 Mbit/s). In this manner, the present embodiments may enable LPI signaling for Ethernet transceivers operating in legacy modes.

In some embodiments, processor 320 may be configured to monitor data received from transceiver 340 to determine whether to generate regular LPI signals or modified LPI signals in response to the data transmission rate. In these embodiments, processor 320 may generate the regular LPI signals when MII 370 is operating at higher speeds of 1 Gbit/s or higher, and may generate the modified LPI signals when MII 370 is operating at lower speeds of 100 Mbit/s or 10 Mbit/s.

Notably, MII 370 is an interface capable of providing two-way communication between MAC device 350 and PHY device 360. Consequently, although the discussion with regard to the above-mentioned techniques is focused on MAC device 350 transmitting LPI signals to PHY device 360, these techniques may be equally applied to the opposite direction as well. For example, MAC device 350 may enter the LPI sleep mode upon receiving either regular LPI signals (e.g., data valid RX_DV=1'b0; receive error RX_ER=1'b1; receive data RX_DATA=8'b0000_0001) or modified LPI signals (e.g., RX_DV=1'b0; RX_ER=1'b1; RX_DATA=8'b0001_0001).

As an addition or an alternative, processor 320 may first detect a transmission rate at which MII 370 is operating. If MII 370 is operating at a transmission rate that is 1 Gbit/s or more, then processor 320 may transmit a regular LPI signal so that the PHY device 360 enters the LPI sleep mode. If MII 370 is operating at a transmission rate that is 100 Mbit/s or less, then processor 320 transmits a modified LPI signal so that the PHY device 360 enters the LPI sleep mode. However, it is noted that detection of the transmission rate at which MII 370 is operating may not be necessary to implement the present embodiments.

Figure 4:
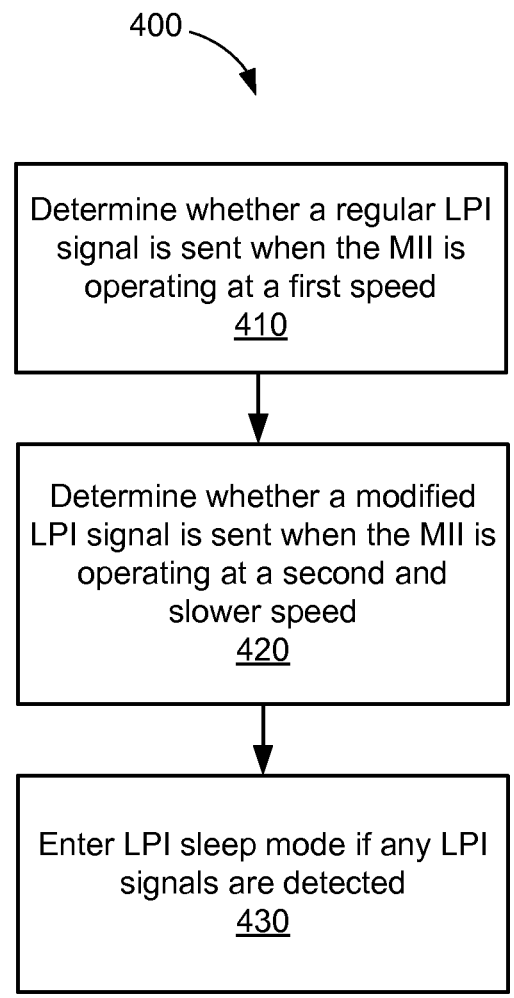
FIG. 4 is a flowchart illustrating an exemplary LPI detection operation for some embodiments of the network device of FIG. 3

FIG. 4 is a flowchart illustrating an exemplary LPI detection operation for embodiments of the network device of FIG. 3. First, with reference to both FIG. 3 and FIG. 4, network device 310 determines whether a regular LPI signal is sent when MII 370 is operating at a first speed (e.g., 1 Gbit/s), and enters an LPI mode upon receiving the regular LPI signal (410). The determination may be performed either by processor 320 or by PHY device 360. Further, network device 310 may determine whether a modified LPI signal is sent when MII 370 is operating at a second and slower speed (e.g., 100 Mbit/s), and enter the LPI mode upon receiving the modified LPI signal (420). The determination may also be performed either by processor 320 or by PHY device 360. In this manner, processor 320 may instruct either PHY device 370 or MAC device 360 or both enter the LPI sleep mode if any LPI signals are detected (430).

It is noted that the embodiments disclosed herein have been described with respect to high-speed Ethernet transceivers operating at slower speeds for simplicity only. It is noted that operating at slower speeds is not to be construed as the only scenario for which the high-speed Ethernet transceivers operate in legacy modes, and that the present embodiments are equally applicable to any other scenarios that involve data repetition and/or combination techniques as well. These scenarios may include, for example, combining several channels to create a higher bandwidth, and/or transmitting data using a dedicated 8 B/10 B SerDes. Similarly, the above-mentioned nibble-to-byte duplicating technique is merely one example of operations that involve data repetition and/or combination techniques. The present embodiments are applicable to any other suitable techniques that involve data repetition and/or combination, including any operations that combine and/or duplicate nibbles into bytes.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of reducing power consumption of an Ethernet device coupled to a network, the Ethernet device having a Gigabit Media Independent Interface (GMII) coupled between a Media Access Control (MAC) layer and a physical (PHY) layer, the method comprising:
   receiving MII signals from the MAC layer;
   entering a low power idle (LPI) mode if the MII signals include a regular LPI signal when the GMII is operating at a first transmission rate; and
   entering the LPI mode if the MII signals include a modified LPI signal when the GMII is operating at a second transmission rate, wherein the second transmission rate is lower than the first transmission rate and the modified LPI signal is distinct from the regular LPI signal.

2. The method of claim 1, further comprising:
   determining a transmission rate at which the GMII is operating; and
   selectively generating either the regular LPI signal or the modified LPI signal for transmission from the MAC layer to the PHY layer in response to the determined transmission rate.

3. The method of claim 2, wherein the regular LPI signal is generated when the GMII is operating in a 1 Gbit/s transmission mode, and the modified LPI signal is generated when the GMII is operating in either a 100 Mbit/s transmission mode or a 10 Mbit/s transmission mode.

4. The method of claim 2, further comprising:
   identifying whether the regular LPI signal or the modified LPI signal is generated in response to the determined transmission rate.

5. The method of claim 1, wherein the GMII is to transmit at least a byte per clock cycle when operating at the first transmission rate, and wherein the GMII is to transmit a nibble per clock cycle when operating at the second transmission rate.

6. The method of claim 5, wherein the first transmission rate is 1Gbit/s, and wherein the second transmission rate is 10 Mbit/s or 100 Mbit/s.

7. The method of claim 1, wherein the LPI mode is in compliance with IEEE 802.3az standards.

8. The method of claim 1, wherein the regular LPI signal comprises TX_DATA=8'b0000_0001, and the modified LPI signal comprises TX_DATA=8'b0001_0001.

9. The method of claim 1, wherein the modified LPI signal comprises a combination of comma sequences K28.5 and D5.2.

10. The method of claim 1, wherein the modified LPI signal comprises a combination of comma sequences K28.5 and D28.4.

11. An Ethernet transceiver having a Gigabit Media Independent Interface (GMII) coupled between a Media Access Control (MAC) layer and a physical (PHY) layer, wherein the Ethernet transceiver comprises:

a processor; and a memory coupled to the processor and having stored therein computer-executable instructions that when executed cause the Ethernet transceiver to:

receive MII signals from the MAC layer;

enter a low power idle (LPI) mode if the MII signals include a regular LPI signal when the GMII is operating at a first transmission rate; and enter the LPI mode upon receiving a modified LPI signal when the GMII is operating at a second transmission rate, wherein the second transmission rate is lower than the first transmission rate and the modified LPI signal is distinct from the regular LPI signal.

12. The Ethernet transceiver of claim 11, wherein execution of the instructions further causes the Ethernet transceiver to:

determine a transmission rate at which the GMII is operating;

generate the regular LPI signal when the GMII is operating at the first transmission rate; and generate the modified LPI signal when the GMII is operating at the second transmission rate.

13. The Ethernet transceiver of claim 11, wherein the regular LPI signal is generated when the GMII is operating in a 1 Gbit/s transmission mode, and the modified LPI signal is generated when the GMII is operating in either a 100 Mbit/s transmission mode or a 10 Mbit/s transmission mode.

14. The Ethernet transceiver of claim 11, wherein execution of the instructions further causes the Ethernet transceiver to:

determine a transmission rate of the GMII; and identify whether the regular LPI signal or the modified LPI signal is generated in response to the determined transmission rate.

15. The Ethernet transceiver of claim 11, wherein the GMII is to transmit at least a byte per clock cycle when operating at the first transmission rate, and wherein the GMII is to transmit a nibble per clock cycle when operating at the second transmission rate.

16. The Ethernet transceiver of claim 15, wherein the first transmission rate is 1 Gbit/s, and wherein the second transmission rate is 10 Mbit/s or 100 Mbit/s.

17. The Ethernet transceiver of claim 11, wherein the LPI mode is in compliance with IEEE 802.3az standards.

18. The Ethernet transceiver of claim 11, wherein the regular LPI signal comprises TX_DATA=8'b0000_0001, and the modified LPI signal comprises TX_DATA=8'b0001_0001.

19. The Ethernet transceiver of claim 11, wherein the modified LPI signal comprises a combination of comma sequences K28.5 and D5.2.

20. The Ethernet transceiver of claim 11, wherein the regular LPI signal comprises a combination of comma sequences K28.5 and D28.4.

* * * * *